(12) United States Patent
Ramer

(10) Patent No.: US 6,382,611 B1
(45) Date of Patent: May 7, 2002

(54) APPARATUS FOR INSTALLING AND REMOVING ANIMAL GUARDS

(76) Inventor: Gary R. Ramer, 11411 Kerry Dr., Little Rock, AR (US) 72209

( * ) Notice: Subject to any disclaimer, the term of this patent is extended or adjusted under 35 U.S.C. 154(b) by 0 days.

(21) Appl. No.: 09/520,396

(22) Filed: Mar. 8, 2000

(51) Int. Cl.$^7$ ................................................ B25B 1/04
(52) U.S. Cl. .......................... 269/238; 81/53.1; 269/6; 269/45
(58) Field of Search ............................ 269/238, 64, 45, 269/254 CS; 81/53.1

(56) References Cited

U.S. PATENT DOCUMENTS

| | | | | |
|---|---|---|---|---|
| 4,696,460 A | * | 9/1987 | Genereaux | 269/6 |
| 4,953,838 A | * | 9/1990 | Peters | 269/45 |
| 5,593,196 A | * | 1/1997 | Baum | 81/53.1 |
| 5,607,344 A | * | 3/1997 | Endres | 269/254 CS |
| 5,650,594 A | * | 7/1997 | Urnovitz | 174/139 |
| 5,794,495 A | * | 8/1998 | Anderson | 81/53.1 |
| 6,267,030 B1 | * | 7/2001 | Rodoni | 81/177.2 |

* cited by examiner

Primary Examiner—Joseph J. Hail, III
Assistant Examiner—Daniel Shanley
(74) Attorney, Agent, or Firm—Dennis B. Haase

(57) ABSTRACT

An implement capable of being mounted for limited articulation on a pole for installation of a guard on an elevated transformer from ground level in which the implement comprises a jaws biased toward one another to grippingly engage a guard of the type having a tongue in a fixed position in said implement for hoisting on the pole to the transformer.

12 Claims, 2 Drawing Sheets

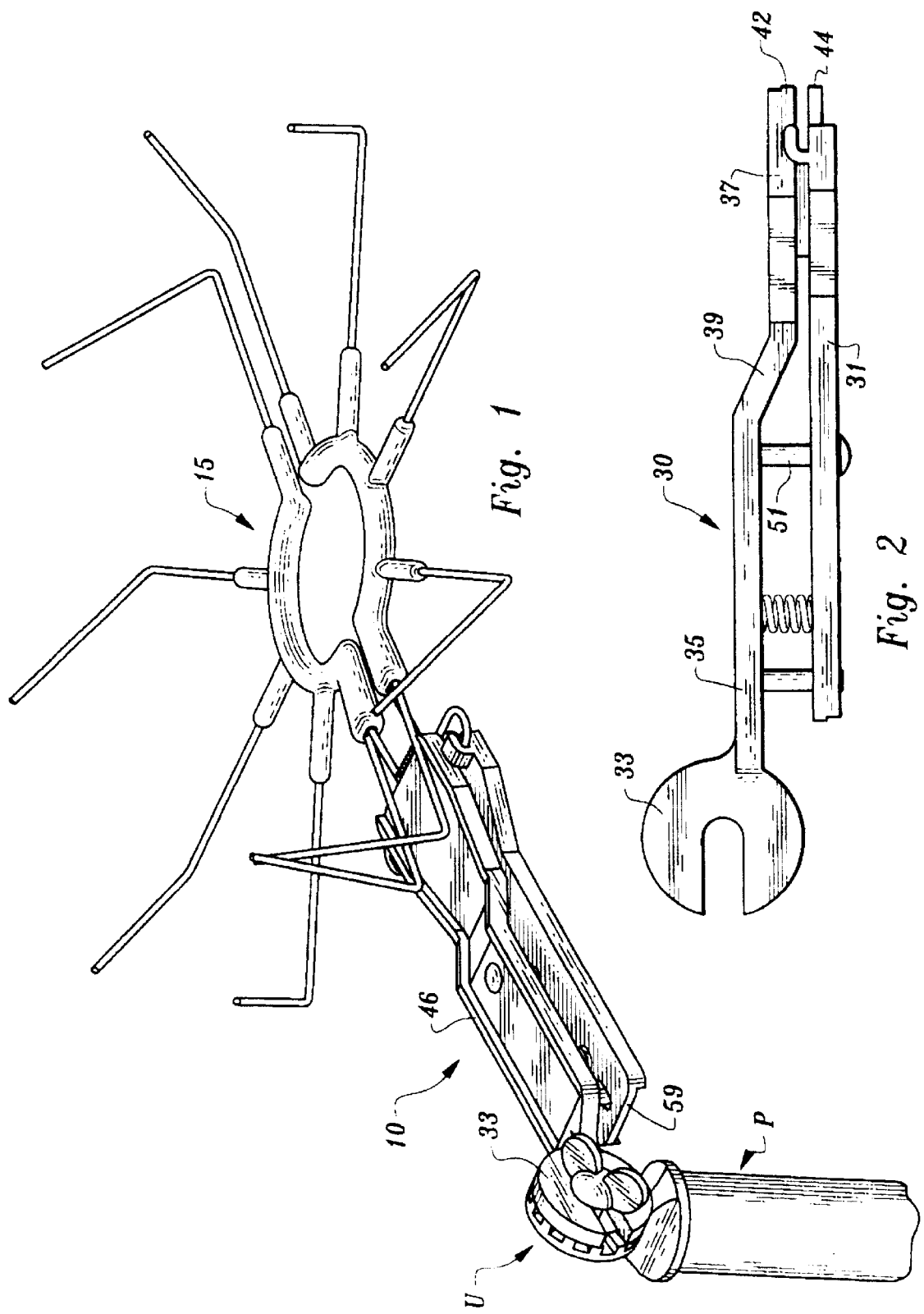

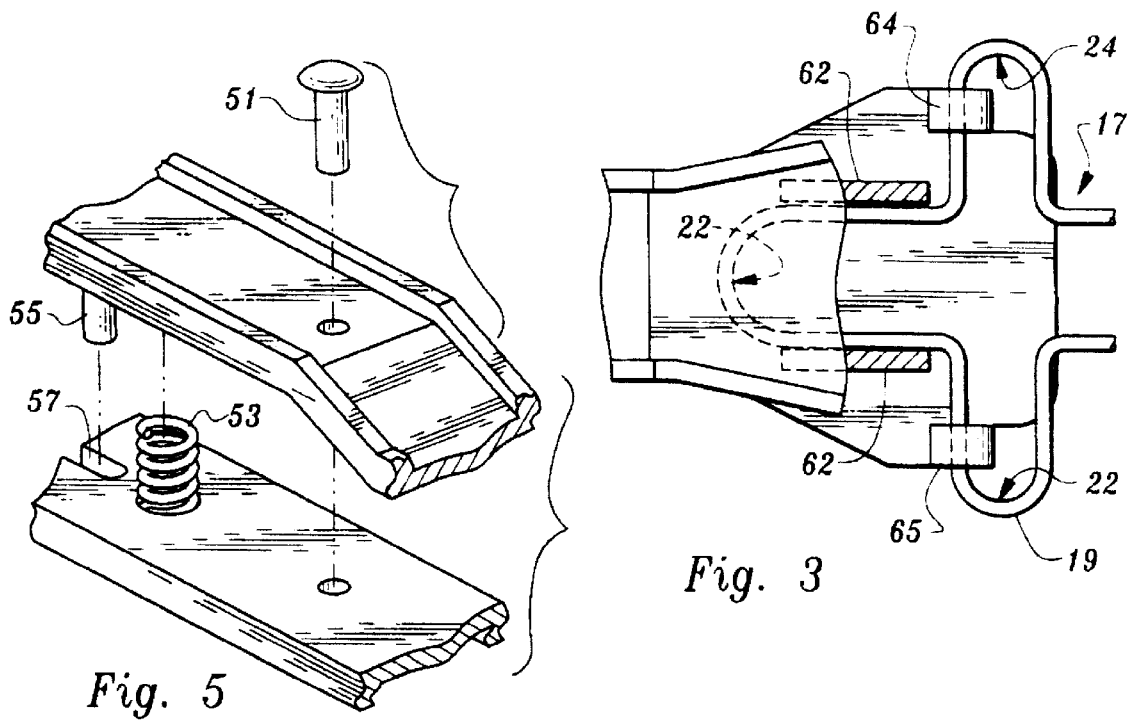
Fig. 5
Fig. 3
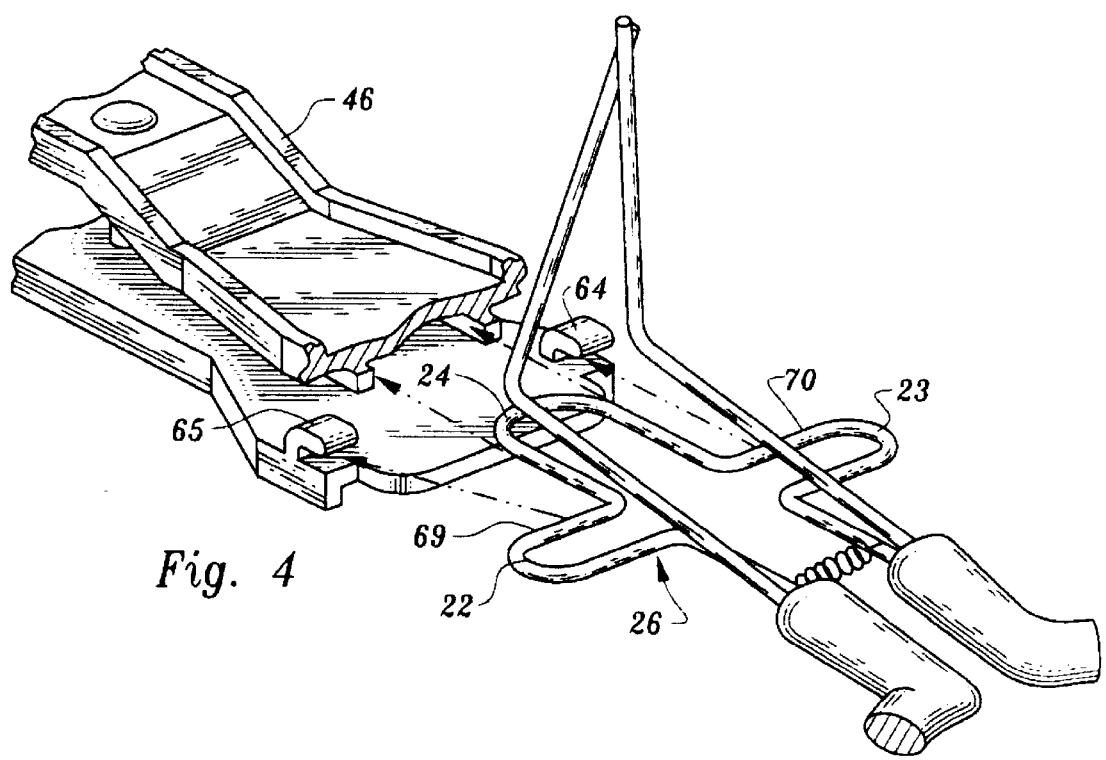
Fig. 4

APPARATUS FOR INSTALLING AND REMOVING ANIMAL GUARDS

The present invention relates generally to devices for installing animal guards on utility transformers and the like, and, more particularly, to the improvements in devices for the installation of Guthrie type animal guard devices on elevated transformers from ground level.

BACKGROUND OF THE INVENTION

1. Field of the Invention

While there is a general trend towards installation of new utility lines underground, there is an enormous number of utility lines and associated transformers which remain above ground and at heights anywhere from 10 feet and higher. It is common for small animals such as squirrels and others of the rodent family, to climb utility poles or descend from tree limbs onto utility wires and to scurry along them. So long as they do not touch more than one wire, or otherwise touch something that is grounded while on a hot wire, no problem is contemplated. However, should they touch two wires or somehow become grounded, the chances of their immediate demise is greatly enhanced.

One area in the utility system where there is eminent danger to transgressing animals is in the immediate proximity of transformers where utility wires enter and leave the transformer, which either steps up or steps down the voltage. Should an animal become electrocuted in that immediate area, there is the prospect of damage to the transformer and related transmission lines, all of which have the potential to interrupt service and to increase maintenance. For this reason, it is extremely desirable to make sure, to the extent possible, that a curious animal does not get crosswise with utility lines.

2. Overview of the Prior Art

There has been, and continues to be, several efforts to ameliorate this problem, one of the most successful of which is the Guthrie guard, manufactured by Minnesota Mining & Manufacturing. It is a device which attaches to an insulator which is disposed about a utility line entering or exiting a transformer and provides a spider like device comprising a series of outwardly extending legs which make it somewhere between difficult and impossible for a small animal to get through, thus protecting it from itself.

Since transformers disposed above the earth's surface are typically more than 10 feet above ground, the manual installation or placement of a Guthrie type guard becomes a chore. One may climb the pole and try and the guard by hand, but to do so would interrupt service and that is not a very practical solution. Moreover, stringent OSHA regulations, sometimes referred to as the two man rule, make such an effort impractical. The use of man lifts and cherry pickers would result in an inordinate equipment expense and is, similarly, impractical.

There have been alternative efforts to place the Guthrie guards on transformer insulators from ground level with what is known in the trade as shot gun sticks. However, because of the nature of the apparatus which grasps the guard in a manner which causes the guard to project outwardly from the end of the stick coaxially therewith, it becomes exceedingly difficult, if not almost impossible to effectively position the guard from ground level.

The patent to Anderson, U.S. Pat. No. 5,794,495 suggests an alternative to the shot gun stick, sometimes referred to as an "extendo" stick. The Anderson concept involves engaging loops formed in the wire which joins the two halves of the Guthrie type guard by means of a group of upstanding prongs. In this manner, the guard can be positioned relative to the stick at an acute angle in order that it can be positioned on the transformer insulator with relative ease from ground level. However, this method has been found to be less than entirely satisfactory in that disengagement with the installed guard is not always successful and displacement of the guard is possible.

An alternative to the Guthrie type guard is found in the patent to Urnovitz, U.S. Pat. No. 5,650,594, wherein a flat plate serves as a guard, and a highly specialized tool is used to position the plate. Since the Guthrie type guard has become somewhat of an industry standard, however, the focus of the present invention is on the facile handling of such guards.

SUMMARY OF THE INVENTION

With the foregoing environment in mind, the present invention provides a safe, economical and simple method of installing and, where necessary, removal, of Guthrie type animal guards on insulators attached to transformers wherein the guard itself is grasped by jaws biased towards one another such that the guard can be readily positioned from the ground and to the extent necessary, removed in the same manner in an exceptionally safe and easy manner.

Another objective of the present invention is to permit one man, at ground level, to quickly and accurately install a Guthrie type guard on the insulator of a transformer using the implement of the present invention. A related objective of the present invention is to permit installation of a Guthrie type guard from ground level with simple manipulation of an extendo type pole, or stick.

A still further objective of the present invention is to provide an implement which not only engages a Guthrie type guard, but secures it in the appliance in a fixed position so as to maintain excellent control over the guide in order to facilitate its mounting in the desired position.

The foregoing, as well as other objectives and advantages of the present invention, will become apparent from a reading of the following detailed description, taken in conjunction with the accompanying drawings, wherein:

DESCRIPTION OF THE DRAWINGS

FIG. 1 is a pictorial representation of the implement of the present invention demonstrating the manner in which it interacts with a Guthrie type animal guard;

FIG. 2 is a side elevation of the implement of FIG. 1, illustrating the construction thereof;

FIG. 3 is a top plan view of the implement of FIG. 1, partially broken away in order to illustrate in detail the manner in which the implement engages the Guthrie type animal guard;

FIG. 4 is a perspective view of the forward portion of the implement of the present invention, partially sectioned to demonstrate the interaction of the implement as it receives a portion of the Guthrie type guard to hold the same for positioning on an insulator disposed on a transformer above ground level; and, FIG. 5 is a perspective view of the implement of the present invention, broken away in order to better illustrate the relative interrelationship between the operative elements of the implement.

DETAILED DESCRIPTION OF A PREFERRED EMBODIMENT

With reference initially to FIG. 1, an implement 10 constructed in accordance with the present invention, is there illustrated. The implement 10 is attached to a pole or stick P, by means of what is sometimes referred to as a universal connector head U. The importance of the universal connector U is to permit articulation of the implement 10 through an acute angle so as to be able to position the implement 10 in a relatively horizontal plane irrespective of the position of the person manipulating the pole on the ground, to thereby facilitate installation.

It will be appreciated that any connector which permits that level of versatility is within the contemplation of the invention.

The implement 10 is shown as engaging a Guthrie type animal guard 15, which is of generally well known construction. Of importance to the functioning of the invention is that the guard 15 includes a planer member 17, best envisioned in FIGS. 3 and 4, which projects outwardly from the guard 15. In the Guthrie guard, the planer member is defined by a wire 19, which is formed into a series of loops 22, 23 and 24. Loops 22 and 24 are mirror images of one another on opposite sides of the planer member 17, and loop 23 extends longitudinally outwardly between the loops 22 and 24. Of significance is that the loops are coplaner, and together, and as part of the planer member 17 define an outwardly projecting tongue 26 (FIG.4).

The implement 10, as perhaps best seen in FIG.2, comprises, in accordance with the invention, an upper jaw 30 and a companion lower jaw 31. The upper jaw serves as the anchor for the implement and, to this end, includes at its rear most end, a circular toothed member 33, which serves as part of the universal connector U. The toothed member 33 is preferably integrally formed with a rear segment 35.

A forward, or leading, segment 37 is disposed in parallel relation with the rear segment 35, and the two segments are joined by means of an intermediate segment 39, which is disposed at a bias with both so as to provide a suitable amount of spacing between the planes of each.

The lower jaw 31 is configured in a single plane, as seen in FIG. 2, and is somewhat shorter in length than the upper jaw 30 as it extends to the rear. The forward terminus of the upper jaw 42 and the forward terminus of the lower jaw 44 are parallel.

In order to provide structural strength, while allowing the jaws to be as thin as possible, a support rail 46 circumscribes the perimeter of both.

The upper and lower jaws, in keeping with an aspect of the invention, are joined by means of a pin 51, which interconnects the lower jaw 31 to the rear segment 35 of the upper jaw 30. The jaws are biased apart by means of a simple coil spring 53, which is positioned rearwardly of the pin 51. A recess (not seen in the drawings) is formed in the facing surfaces, respectively, of the lower jaw 31 and the rear segment 35, so as to retain the spring 53 in its operative position.

Further in keeping with the invention, in order to obviate any tendency of the lower jaw 31 to rotate about the pin 51 relative to the upper jaw 30, a stop 55 is formed near the rearmost end of the rear segment 35, which projects downwardly and into a mating slot 57 formed near the rear edge 59 of the lower jaw 31.

It will be appreciated that the implement 10, so configured, results in the forward termini 42 and 44 of the upper and lower jaws 30 and 31 being biased toward one another so as to provide a gripping or frictional force on any object placed between them to thereby hold the object in place.

With reference once again to FIGS. 3 and 4, it is the stated objective of the implement 10 of the present invention to engage the guard 15 in such a manner that a person manipulating the implement on a pole P can accurately and easily secure the guard to an insulator of a transformer from ground level, and this is clearly accomplished by the implement 10 by engaging the tongue 26 of the guard 15 within the implement 10 and between the jaws 30 and 31 Thus, as seen best in FIG. 4, the tongue is slidable into and between the termini 40 and 42 of the jaws 30 and 31, where it is securely held during manipulation of the pole P upon which the appliance is mounted.

As previously pointed out, it is a further objective of the present invention to permit precise control of the guard's position during the installation process, and to this end, the upper jaw is formed, in depending fashion from its forward segment, with spaced apart guides 62. The guides 62 are so spaced as to receive the loop 23 of the tongue 26 in such a manner that lateral twisting or movement of the loop 23 when it is positioned in the jaws of the implement 10, is inhibited, and its axial position is, thus, defined.

In furtherance of the objective of maintaining control over the guard when positioned in the implement for mounting to an insulator, the lower jaw 31 is formed with a pair of opposed wings 64 and 65, which define, with the inner surface 67 of the lower jaw 31, slots, which slots are coplaner and adapted to receive and engage the forward edges the guard, in the form of the loops 22 and 23, thereby determining the limits of the insertion of, the tongue 26 between and within the implement 10.

It will now be appreciated that the position of the guard 15, when in the grasp of the implement 10, is fully determined and repeatable, so that the person attempting to install the guard by means of a pole several feet above his or her head, and perhaps unable to see the relative position of the guard relative to the insulator on the transformer, can nonetheless be confident of where the guard is at all times and, thus, install it time after time with great confidence that it has been done correctly.

Having now described a preferred embodiment in considerable detail, it will be understood that guards other than a Guthrie type guard may be installed with equal facility so long as it has the requisite tongue configuration, and that other variations are clearly within the contemplation of the invention.

What is now claimed is:

1. For use in the installation of an animal guard having a planer member for protecting small animals from electrocution in the immediate vicinity of a remotely located utility transformer;

an implement for engaging and installing an animal guard on or about a transformer;

said implement comprising a pair of opposed jaws, said jaws being joined together in opposed relation, and each having a forward terminus;

a spring, positioned and disposed between said jaws so as to bias the terminus of each of said jaws toward one another in gripping relation;

said animal guard is grippingly held between said jaws by its planer member for installation on a transformer; and means is formed on said jaws to precisely and repeatably position the animal guard there between.

2. The invention as set forth in claim 1, wherein said jaws are joined by a fastener.

3. The invention as set forth in claim 2, wherein said spring is disposed rearwardly of said fastener.

4. The invention as set forth in claim 1, wherein said implement is mounted on a pole so as to be rotatable relative to said pole through an acute angle.

5. The invention as set forth in claim 1, wherein slots are provided between said jaws so as to define the relative axial position of the animal guard.

6. The invention as set forth in claim 1, wherein one of said jaws is formed with wings, said wings being formed near the terminus of said jaw, defining with said one of said jaws, slots, the planer member of the animal guard being inserted into said slots so as to position the animal guard between said jaws, said wings adapted to engage a position of the guard so as to define the limits of the insertion of the guard between said jaws of said implement.

7. Apparatus for the installation of a Guthrie type animal guard having a planer member on or about an electrical transformer remotely disposed above ground level by means of an elongated pole having an implement appended to an end thereof, said implement adapted to engage and install the guard on or about the transformer;

said implement comprising a pair of opposed jaws, said jaws being joined together in opposed relation, and each having a forward terminus;

a spring, positioned and disposed between said jaws so as to bias the terminus of each of said jaws toward one another in gripping relation;

whereby a guard is grippingly held between said jaws for installation on a transformer;

said implement being mounted for limited articulation to one end of a pole so as to permit the guard to be installed on a transformer which is above ground level from a position on the ground;

guide means formed on said jaws to precisely position a guard there between.

8. The invention as set forth in claim 7, wherein said jaws are joined by a fastener.

9. The invention as set forth in claim 8, wherein said spring is disposed rearwardly of said fastener.

10. The invention as set forth in claim 7, wherein said implement is mounted on a pole so as to be rotatable relative to said pole through an acute angle.

11. The invention as set forth in claim 7, wherein slots are provided between said jaws so as to define the relative axial position of the animal guard.

12. The invention as set forth in claim 7, wherein one of said jaws is formed with wings, said wings being formed near the terminus of said jaw, defining with said one of said jaws, slots, the planer member of the animal guard being inserted into said slots so as to position the animal guard between said jaws, said wings adapted to engage a position of the guard so as to define the limits of the insertion of the guard between said jaws of said implement.

* * * * *